Jan. 4, 1944.    J. A. ROCHÉ    2,338,302
PROPELLER HUB
Filed July 29, 1940    4 Sheets-Sheet 1

INVENTOR
JEAN A. ROCHE
BY
ATTORNEY

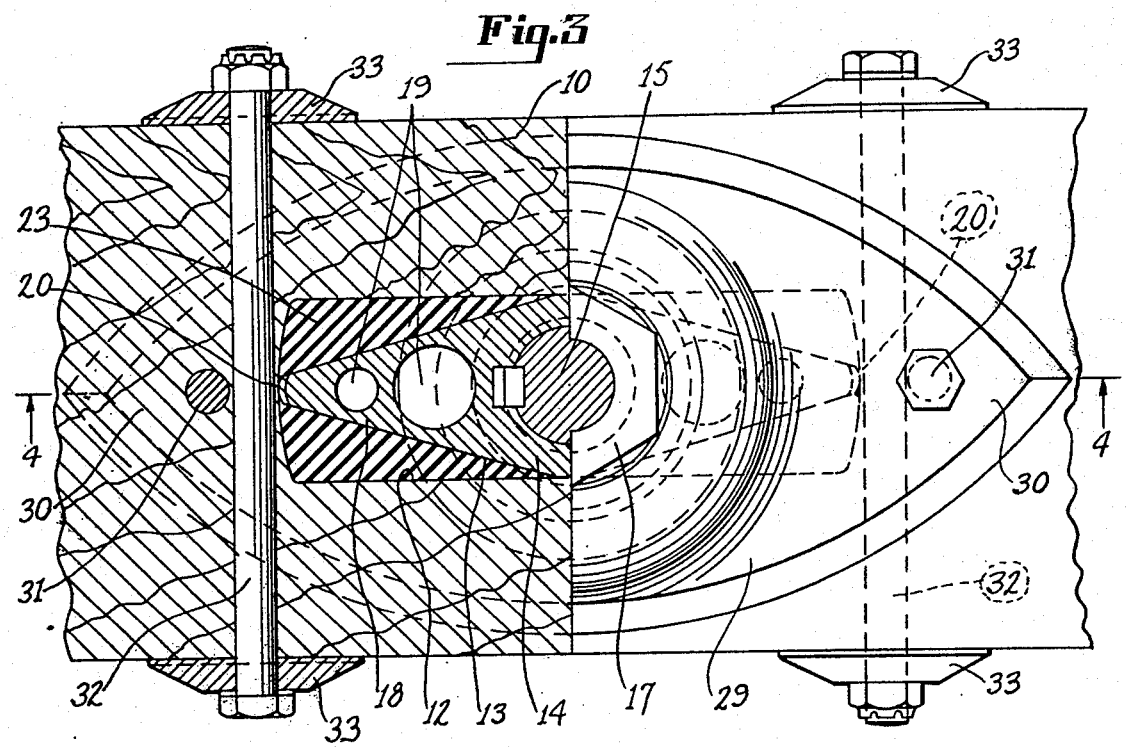
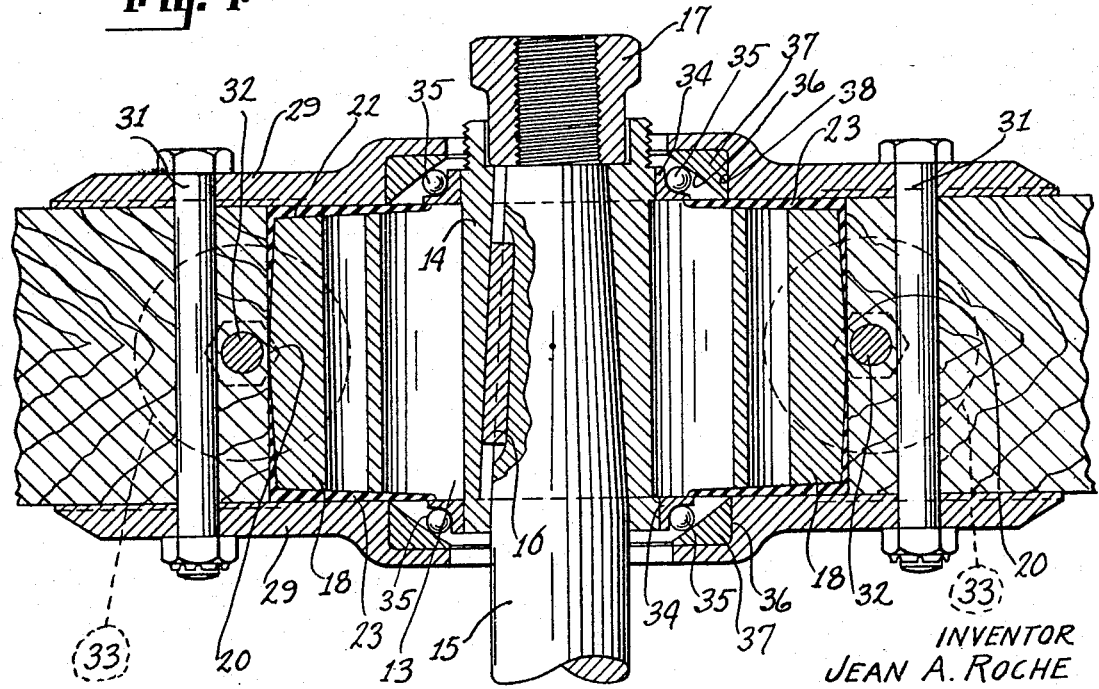

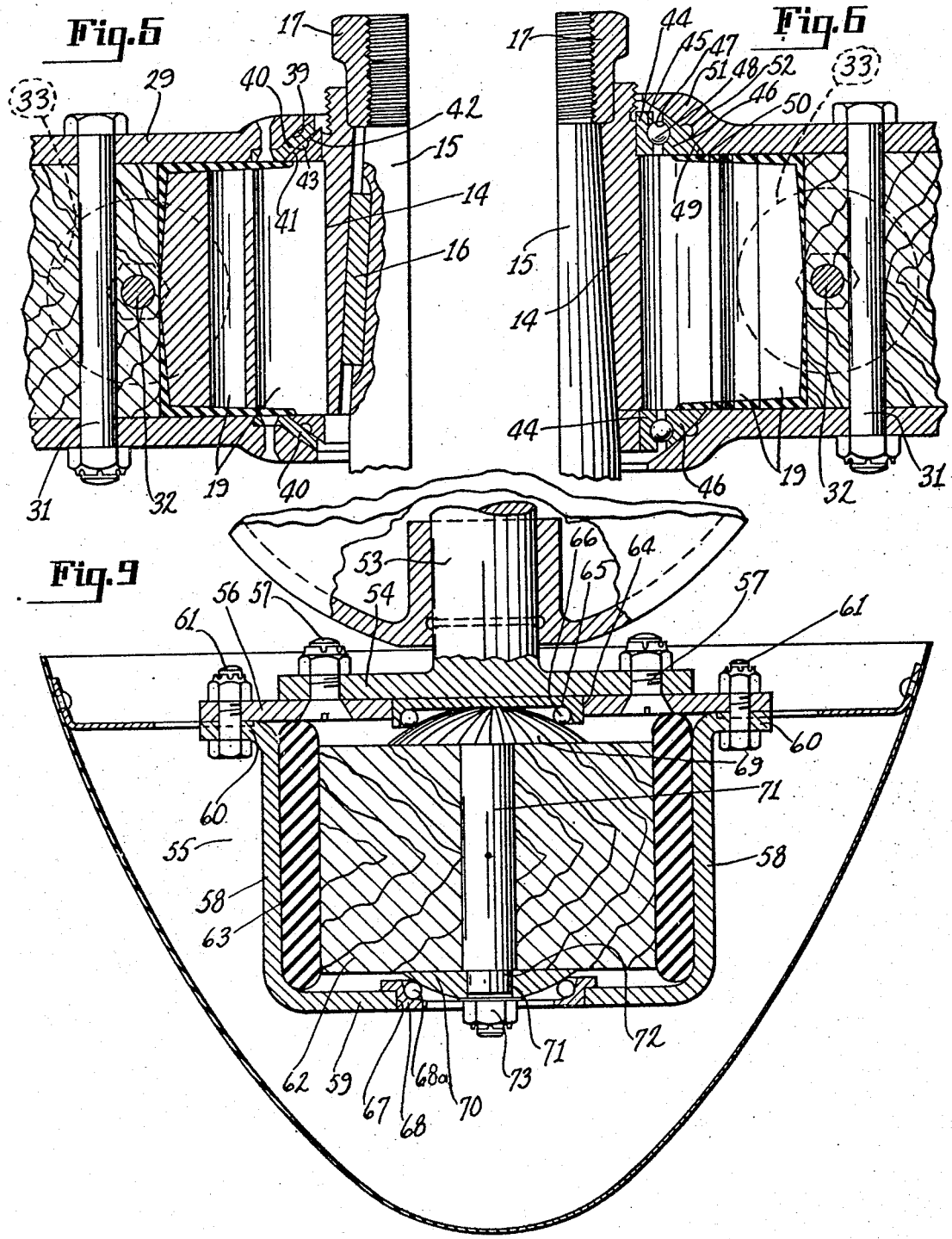

Jan. 4, 1944.   J. A. ROCHÉ   2,338,302
PROPELLER HUB
Filed July 29, 1940   4 Sheets-Sheet 4

INVENTOR
JEAN A. ROCHE
BY
ATTORNEY

Patented Jan. 4, 1944

2,338,302

UNITED STATES PATENT OFFICE 2,338,302

PROPELLER HUB

Jean A. Roché, Dayton, Ohio

Application July 29, 1940, Serial No. 348,139

20 Claims. (Cl. 170—173)

This invention relates to a hub for a propeller, such as is used on aircraft and for like purposes.

One object of the invention is to provide such a hub having simple compact means for effecting an efficient yieldable driving connection between the blades and the driving shaft.

A further object of the invention is to provide such a yieldable connection which will be applicable to continuous blade structures in which an intermediate part of the blade structure constitutes the driven member of the hub.

A further object of the invention is to provide such a hub in which the driven member will be free to tilt against yieldable resistance and thus permit the blades to rotate out of a track when their thrust is unequal.

A further object of the invention is to provide positive means for centering the driven member of the hub with relation to the driving member thereof and maintaining same so centered during the tilting of the driven member.

A further object of the invention is to provide such a hub for a wooden propeller with means for preventing the splitting of the wood.

A further object of the invention is to provide such a hub which is applicable to a flanged propeller shaft.

Other objects of the invention may appear as the hub is described in detail.

Figure 1:
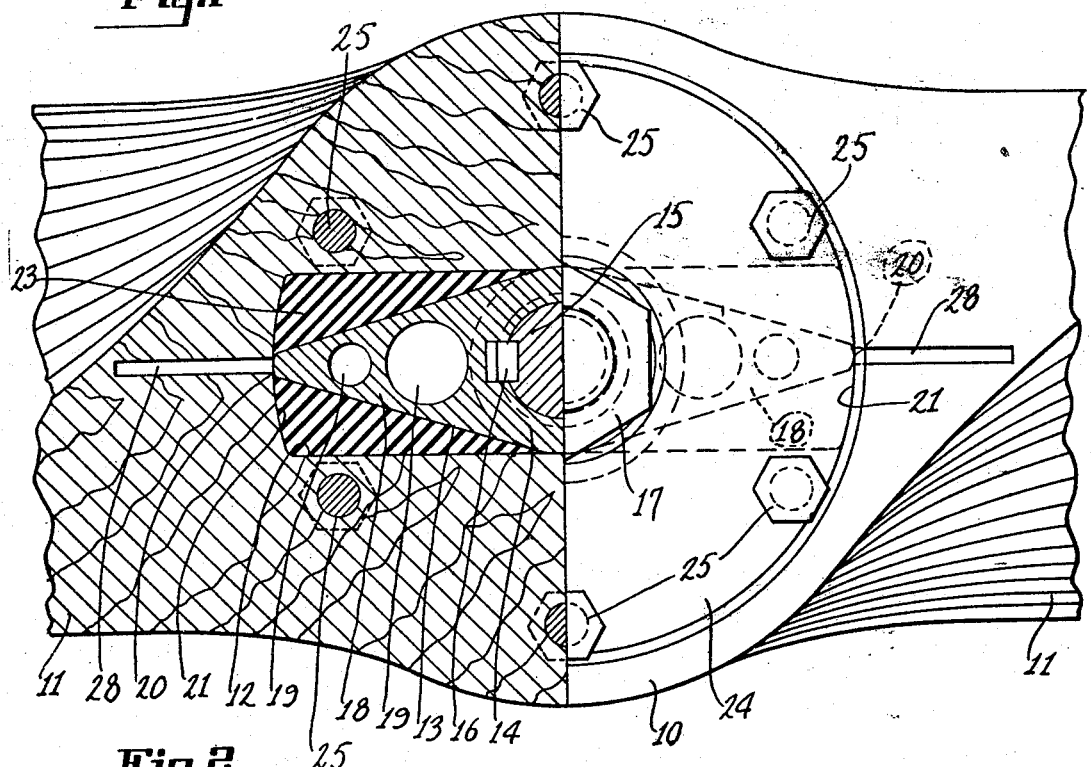
Figure 2:
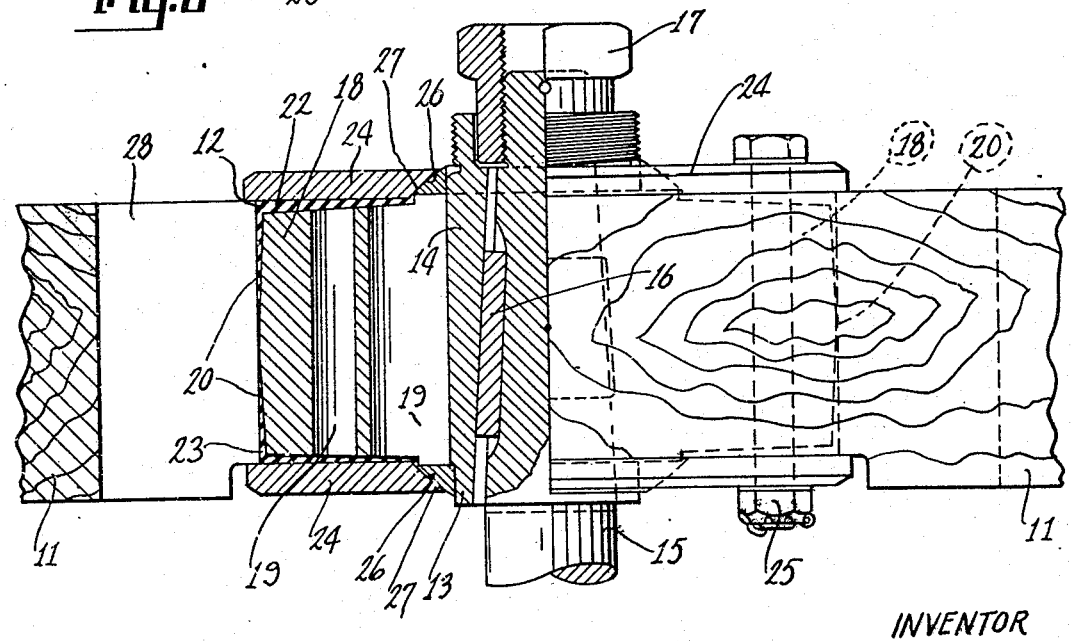
Figure 7:
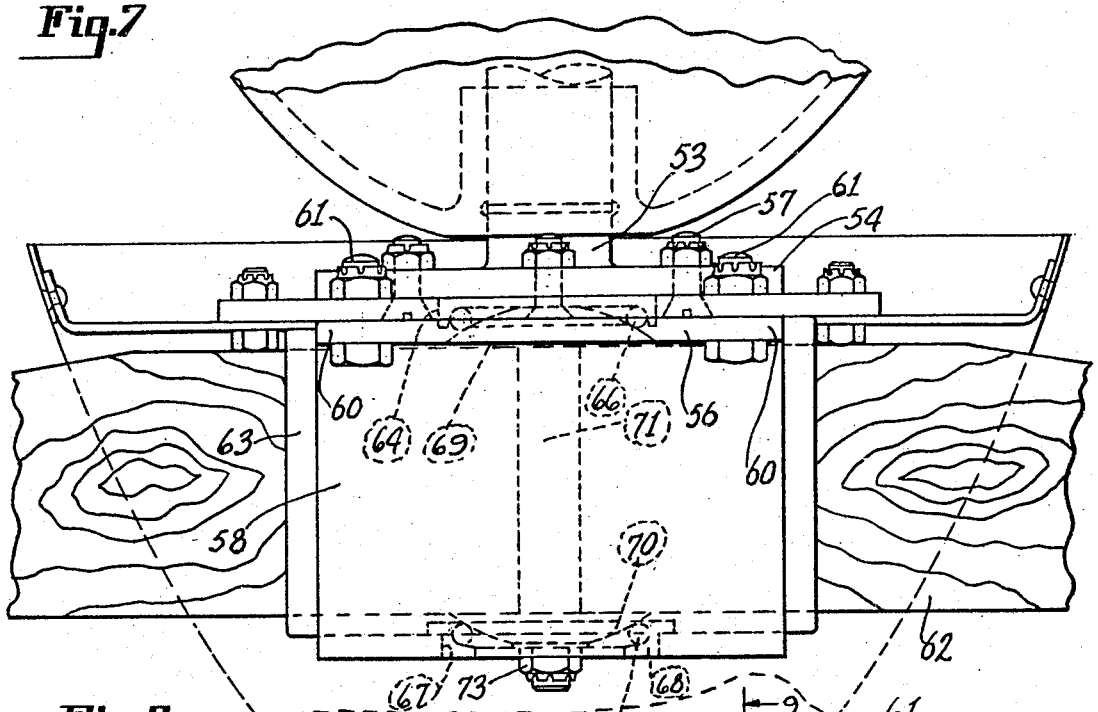
Figure 8:
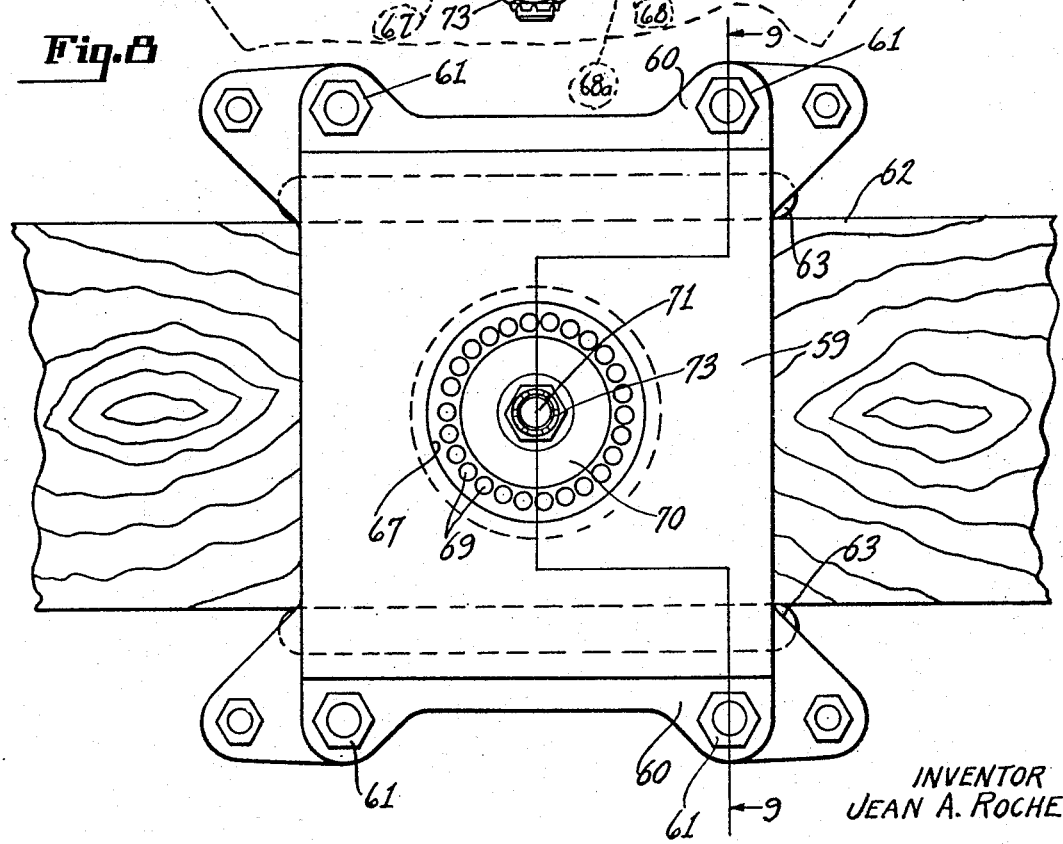

In the accompanying drawings Fig. 1 is a front elevation, partly in section, with the blades broken away, showing one embodiment of my invention; Fig. 2 is a side elevation, partly in section, of the hub of Fig. 1; Fig. 3 is a front elevation, partly in section, of another embodiment of my invention, with the blades broken away; Fig. 4 is a longitudinal sectional view taken on the line 4—4 of Fig. 3 and partly broken away; Fig. 5 is a partial section of a hub showing a modified form of bearing; Fig. 6 is a similar view showing another form of bearing; Fig. 7 is a plan view of a modified form of hub with the propeller blades broken away; Fig. 8 is a front elevation of the hub of Fig. 7; and Fig. 9 is a sectional view taken on the line 9—9 of Fig. 8.

In these drawings I have illustrated certain embodiments of my invention, each of which is designed primarily for a continuous blade structure in which the driven member of the hub is an integral part of the blade structure, such as the usual one piece wooden propeller. It will be understood, however, that these embodiments are shown for the purpose of illustration only and that the invention may take various forms and may be applied to propellers in various ways.

As shown in these drawings the hub comprises a driving member, adapted to be secured to the propeller or driving shaft, and a driven member which carries the blades and is mounted on the driving member for both a limited rotatory movement with relation thereto and for tilting movement with relation thereto about an axis passing through the center of gravity of the propeller and substantially normal to the plane formed by the line connecting the tips of the two blades and the axis of rotation, that being the axis about which motion of the propeller will not result in a change of pitch of either blade. Yieldable means are provided to establish a driving connection between the driving member and the driven member and to lightly resist the above-described limited tilting movement of the propeller with relation to the driving member.

In the embodiments shown in Figs. 1 to 4 the driven member 10 of the hub is a part of a continuous blade structure and is integral with the blades 11. The driven member, whether integral with or formed separately from the blades, is provided with an opening or slot 12 to receive the driving member 13 on which the driven member is supported for both a limited rotatary movement and a tilting movement. The driving member is provided with parts arranged in opposed relation to and spaced from the adjacent walls of the opening in the driven member to receive the resilient means which cushions the driven member and resists the tilting thereof. Preferably the opening 12 is an elongate opening, or relatively wide slot, extending entirely through the driven member of the hub and having its major dimension lengthwise of the blades, the side walls of the opening being substantially parallel. The driving member of the hub comprises a tubular central portion 14 having a tapered longitudinal bore to receive the tapered end of the driving shaft 15, which may be rigidly secured thereto in any suitable manner, as by a key 16 and a nut 17. This tubular portion of the driving member is of a diameter approximately equal to the width of the opening 12 and it is provided on opposite sides with vanes 18 which extend therefrom in the direction of the respective blades and are spaced from the respective sides of the opening. In the present instance, the lateral surfaces of the vanes 18 converge toward the respective ends of the opening 12 and are provided with openings 19 to reduce the weight thereof. The fore and aft faces or edges of each vane converge slightly toward the adjacent end of the opening 12, as shown at 22, and the radial outer faces or edges are so shaped as to permit tilting of the propeller about the axis defined above, as shown at 20. Thus clearance spaces are provided between the outer faces and the fore and aft faces of the vanes with respect to the slot or opening in the driven member to permit the tilting movements of the blades. The high points of the end edges of the vanes are located close to the curved end walls of the opening but when the driven member is formed of wood this high point does not contact therewith. Yieldable elements 23, such as rubber having the desired degree of resiliency, are interposed between the sides of the vanes and the adjacent side walls of the opening and are preferably confined therebetween under pressure, so that they tend to hold the driven member normally in a predetermined position with relation to the driving member. Preferably they are initially of such a length that they project slightly beyond the spaces between the vanes and the walls of the opening and these projecting portions are then pressed into the spaces to cause the rubber to be confined under pressure. Annular end plates 24 are rigidly secured to the driven member, as by bolts 25, and extend across the edges of the vanes and the ends of the rubber blocks to retain the latter in the respective spaces and to hold the driven member against axial movement with relation to the driving member, and these plates contact the projecting ends of the rubber blocks during the assembly of the hub and, when the bolts are tightened down, press these projecting portions of the blocks into and retain them in the respective recesses. In the present arrangement the frictional contact between the rubber inserts and the vanes provides a light but sufficient resistance to the tilting of the blades, and, if desired, the rubber elements may be treated with talc or the like to facilitate tilting and to aid in the insertion of the rubber elements. If desired, the clearance spaces at the edges of the vanes may be filled with soft rubber, as shown in the drawings, but this is not essential and in some cases it may be preferable to leave the spaces open.

Means are provided for positively centering the driven member with relation to the driving member and for maintaining the driven member so centered during its tilting movement. This centering means may take various forms but it preferably comprises bearings arranged at the respective ends of the hub and of such a character as to permit both the rotatory movement and the tilting movement of the driven member. As shown in Fig. 2, the driving member 13 is provided near each end thereof with an annular bearing surface 26 concentric with the axis of the hub, and the inner edge of each annular end plate is provided with a bearing surface 27 which cooperates with the bearing surface 26 to center the driven member with relation thereto. In the arrangement shown in this figure the two bearing surfaces contact directly one with the other and are so shaped as to permit the tilting movement of the driven member as well as its rotatorv movement. In this arrangement the two bearing surfaces at both ends of the hub conform substantially to portions of a sphere the center of which is coincident with the center of mass of the propeller, thus permitting the driven member not only to have rotatory movement about the axis of the hub but also to tilt about an axis such that the pitch of the blades will not be varied by such tilt.

In a hub of this character, when used with a wooden propeller, the impulses of the vanes, even when cushioned, may have a tendency to split the driven member of the hub, this being particularly true if the bolts 25 do not fit tightly in their holes. I have therefore provided the hub with means for preventing the splitting of the driven member. As shown in Figs. 1 and 2 the driven member is provided at each end of the opening 12 with a relatively short preformed slot 28 which extends from the opening lengthwise of the blade. By so slotting the driven member the lateral portions thereof are provided with resiliency sufficient to enable the same to be pressed into firm contact with the bolts with little or no tendency to split the wood.

In Figs. 3 and 4 there is illustrated a different means for preventing the splitting of the hub. As shown in those figures the driving and driven members are substantially similar to those shown in Figs. 1 and 2 but the end plates 29 are provided with parts which extend for a substantial distance beyond the opening 12 of the driven member, they being here shown as having their ends tapered, at 30, and the bolts 31 which connect the plates with the driven member extend through these projecting portions of the end plates. Other bolts 32 extend through the driven member transversely to the bolts 31 and adjacent the respective ends of the opening 12. By spacing the bolts 31 a substantial distance from the ends of the opening the bolts 32 may be inserted between the bolts 31 and the opening so as to place them at the point of greatest strain. Relatively thick washers 33 are placed about the respective ends of the bolts 32 to provide the latter with relatively large surfaces to contact the driven member. The bolts 32 are so tightened as to resist any tendency of the hub to split, while the function of the bolts 31 is merely to secure the end plates to the hub so as to close the opening or slot, retain the rubber inserts therein and maintain the outer bearing members in proper relation to the propeller and in true spherical relation to each other.

In Fig. 4 there is also shown another type of bearing for centering the driven member with relation to the driving member. As there shown, there is secured to the driving member near each end thereof an annular bearing member 34 the bearing surface of which is in the form of a ball race in which are mounted balls 35. The driven member is provided at each end with a bearing surface 36 which contacts with the balls 35 and these bearing members are shown as conforming substantially to portions of a sphere the center of which is coincident with the center of mass of the propeller. In the construction shown in Fig. 4 the bearing surfaces 36 are formed on a annular bearing members 37 which are mounted in recesses 38 in the inner portions of the end plates 29.

In Figs. 5 and 6 there are shown other forms of bearings. The bearing of Fig. 5 is similar to that shown in Fig. 2 with the exception that the inner edge of each end plate is flared, as shown at 39, to provide a space in which there is mounted an annular member 40, of suitable bearing material, on which is formed a bearing surface 41 which contacts with a bearing surface 42 on the driving member, the latter being provided with a lubricant groove 43 in which there may, if desired, be inserted an absorbent element or wick impregnated with lubricant. The bearing surfaces 41 and 42 have direct contact one with the other and are of partial spherical form as described in connection with Fig. 2.

In Fig. 6 the driving member is provided with an annular bearing member 44 having its outer face substantially parallel with the axis of the driving member and provided with a ball race 45. The driven member is also provided with an annular bearing member 46 having a ball race 47 opposed to the ball race 45, balls 48 being inserted in the races. The bearing member 46 of the driven member is not movable with relation to the bearing member 44 in such a manner as to permit the tilting movement of the driven member but the latter is so connected with the bearing member 46 that it may have such movement with relation thereto. For this purpose the bearing member 46 is provided on its outer face with a bearing surface 49 which cooperates with a bearing surface 50 formed on the inner face of the outwardly flared portion 51 of the end plate, and provided with a lubricant groove 52, the bearing surfaces 49 and 50 being of spherical form as above described and thereby permitting the driven member to tilt with relation to the driving member. This is a desirable construction because it provides a rolling type of bearing for the motion due to torque impulses which occur continuously as long as the engine is running and, therefore, might produce heat and galling in a friction type of bearing, while a simple plain spherical bearing is shown to take care of the tilting action which occurs relatively seldom, that is only when a change in blade thrust occurs which requires compensation.

In Figs. 7, 8 and 9, there is shown an embodiment of the invention designed for use with a flanged driving shaft, that is, the shaft does not extend through either member of the hub but is provided with means whereby it may be secured to the driving member. In these figures there is shown a portion of a driving shaft 53 provided at its end with a circumferential flange 54. Rigidly secured to this flange is a housing 55 which constitutes the driving member of the hub. This housing may take various forms and, as here shown, it comprises a plate 56 rigidly secured to the flange 54, as by screws 57. Rigidly secured to the plate 56 is a U-shaped member comprising side walls 58 and a bottom wall 59. This U-shaped member is rigidly secured at its open end to the plate 56 and, as here shown, is provided with apertured lugs 60 to receive the bolts 61 which connect the same with the plate. An intermediate portion 62 of a blade structure is mounted between the side walls 58 of the housing with its lateral edges spaced from the respective side walls, and yieldable elements such as blocks 63 of resilient rubber are inserted between the lateral surfaces of the blade structure and the respective side walls. Preferably these rubber blocks extend beyond the front and rear surfaces of the blade structure 62 for contact with the end wall 59 and plate 56. Thus these resilient elements provide a yieldable driving connection between the driving member of the hub and the blade structure and permit the blade structure to tilt with relation to the driving member about an axis passing through the center of gravity of the propeller and normal to the plane established by the axis of rotation and a line connecting the blade tips. In the present instance the side walls 58 of the housing are substantially parallel and the lateral surfaces of the blade structure 62 are substantially parallel one with the other and with the side walls, thus permitting the use of a rubber block of substantially uniform thickness throughout its area.

The means for centering the blade structure or driven member with relation to the driving member or housing are substantially similar to the centering means above described but differ slightly therefrom in construction and arrangement. The plate 56 is provided with an opening 64 in line with the shaft 53 and in this opening is mounted a bearing member 65 having an annular ball race to receive the balls 66. The end wall 59 of the housing is provided with an opening 67 in axial alinement with the opening 64 and in this opening is mounted an annular ball race 68 to receive balls 68a. The blade structure is provided on both its rear and front sides with bearing members which cooperate with the respective bearing members of the driving member and are shaped to permit tilting movement of the blade structure. In the particular construction shown the bearing members for the blade structure are in the form of plates 69 and 70 of a diameter greater than the diameter of the bearing members 65 and 68 so that the surface of each bearing plate can engage the balls of the respective ball races. The bearing surfaces of these plates conform substantially to parts of a sphere the center of which is coincident with the center of mass of the propeller. In order to retain the bearing members 69 and 70 in fixed relative positions they are preferably rigidly connected one with the other. As here shown, a shank 71 is rigidly secured to, or formed integral with, the plate 69, extends through the blade structure and is provided near its forward end with a reduced portion which forms thereon a shoulder 72. The front bearing plate 70 is mounted on this reduced portion of the shank and is clamped against the shoulder 72 by a nut 73.

While the relative positions of the driven and driving members shown in Figs. 7, 8 and 9, are the reverse of those shown in the other figures, the driven member is capable of both rotatory movement and tilting movement with relation to the driving member, and in common with the other embodiments of the invention this form of hub permits the propeller to untrack and permits torsional displacement of the driving shaft with respect to the propeller and at the same time provides positive metal to metal centering means for the driven member.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent is:

1. In a propeller hub, a driving member having means for securing the same to a driving shaft, a blade supporting driven member, one of said members having an opening in which the other member is so mounted that said driven member may have tilting movement to permit untracking without permitting pitch changes in the blades, said opening having substantially parallel side walls and the member which is mounted in said opening having parts opposed to and spaced from said side walls, resilient elements mounted between said side walls and said opposed parts to drivingly connect said driving and driven members and to lightly resist the untracking movement of said driven member, said members having cooperating bearing surfaces to center said driven member with relation to said driving member, at least one of said bearing surfaces being transversely curved about an axis located substantially at the center of the mass of the propeller to permit said driven member to tilt with relation to said driving member.

2. In a propeller hub, a driving member having means for securing the same to a driving shaft, a blade supporting driven member, one of said members having an opening in which the other member is so mounted that said driven member may have tilting movement to permit untracking without permitting pitch changes in the blades, said opening having substantially parallel side walls and the member which is mounted in said opening having parts opposed to and spaced from said side walls, resilient elements mounted between said side walls and said opposed parts to drivingly connect said driving and driven members and to lightly resist the untracking movement of said driven member, said driving member having near each end thereof a ball race, concentric with the axis thereof, balls mounted in said race, and said driven member having bearing surfaces engaging the balls in the respective races to center said driven member with relation to said driving member, each of said bearing surfaces being curved about an axis located substantially at the center of mass of the propeller to permit the tilting movement of said driven member.

3. In a propeller hub, a driving member having means for securing the same to a driving shaft, a blade supporting member, one of said members having an opening in which the other member is so mounted that said driven member may have tilting movement to permit untracking without permitting pitch changes in the blades, the member which is mounted in said opening having parts spaced about its axis of rotation and arranged in opposed relation to and spaced from adjacent parts of the other member, resilient elements mounted between said opposed parts to drivingly connect said members and to lightly resist the untracking movement of said driven member, said members having cooperating bearing surfaces to center said driven member with relation to said driving member, at least one of said bearing surfaces being transversely curved about an axis located substantially at the center of mass of the propeller, to permit said driven member to tilt with relation to said driving member.

4. In a propeller hub, a driving member, a driven member having an elongate opening to receive said driving member and mounted about said driving member for tilting movement with relation thereto, said driving member having oppositely extending parts arranged between and spaced from the side walls of said opening, resilient elements interposed between the respective sides of each of said parts and the adjacent walls of said opening, said driving and driven members having cooperating bearing surfaces concentric with the axis of said hub to center said driven member with relation to said driving member, at least one of said bearing surfaces being transversely curved about an axis located substantially at the center of mass of the propeller to permit the tilting movement of said driven member.

5. In a propeller hub, a driving member, a driven member having an elongate opening to receive said driving member and mounted about said driving member for tilting movement with relation thereto, said driving member having oppositely extending parts arranged between and spaced from the side walls of said opening, resilient elements interposed between the respective sides of each of said parts and the adjacent walls of said opening, said driving member having near each end thereof a bearing surface concentric with its axis, and end plates extending across the respective ends of said opening, rigidly secured to said driven member and each having a bearing surface to cooperate with the adjacent bearing surface of said driving member, at least one of said bearing surfaces of each pair being transversely curved about an axis located substantially at the center of mass of the propeller to permit the tilting of said driven member.

6. In a propeller hub, a continuous blade structure having an intermediate portion provided with an opening and constituting the driven member of a two part hub, a driving hub member mounted in said opening and having parts arranged in opposed relation to the respective walls of said opening, resilient elements interposed between said parts of said driving member and said walls to provide a yieldable driving connection between said driving member and said driven member, end plates extending across the respective ends of said opening, bolts for securing said end plates to said blade structure and other bolts extending through said blade structure adjacent the respective sides of said opening and transversely to the first mentioned bolts.

7. In a propeller hub, a continuous blade structure having an intermediate portion provided with an opening and constituting the driven member of a two part hub, a driving hub member mounted in said opening and having parts arranged in opposed relation to the respective walls of said opening, resilient elements interposed between said parts of said driving member and said walls to provide a yieldable driving connection between said driving member and said driven member, end plates extending across the respective ends of said opening and having parts projecting beyond the sides of said opening toward the respective blades, bolts connecting said projecting parts of the two end plates one with the other and with said blade structure, and other bolts extending through said blade structure adjacent said sides of said opening and transversely to the first mentioned bolts.

8. In a propeller hub, a driving member, a driven member mounted for limited rotatory movement with relation to said driving member about the axis of the latter and for tilting movement with relation to said driving member to permit untracking without permitting pitch changes in the blades, each member having parts arranged about said axis in opposed relation to the adjacent parts of the other member, resilient means interposed between the respective opposed parts of said members to drivingly connect the same and to resist the tilting movement of said driven member, said driving and driven members having near each end thereof a pair of cooperating annular bearing surfaces, at least one bearing surface of each pair being curved about the center of mass of said propeller to permit the tilting movement of said driven member.

9. In a propeller hub, a driving member, a driven member mounted for limited rotatory movement with relation to said driving member about the axis of the latter and for tilting movement with relation to said driving member to permit untracking without permitting pitch changes in the blades, each member having parts arranged about said axis in opposed relation to the adjacent parts of the other member, resilient means interposed between the respective opposed parts of said members to drivingly connect the same and to resist the tilting movement of said driven member, said driving member having near each end thereof a part provided with a bearing surface concentric with the axis of said hub and said driven member having parts provided with bearing surfaces to cooperate with the respective bearing surfaces of said driving member, the bearing surfaces of said driven member conforming substantially to portions of a sphere the center of which is coincident with the center of mass of the propeller.

10. In a propeller hub, a driving member, a driven member mounted for limited rotatory movement with relation to said driving member about the axis of the latter and for tilting movement with relation to said driving member to permit untracking without permitting pitch changes in the blades, each member having parts arranged about said axis in opposed relation to the adjacent parts of the other member, resilient means interposed between the respective opposed parts of said members to drivingly connect the same and to resist the tilting movement of said driven member, said driving member having near each end thereof a part provided with a bearing surface concentric with the axis of said hub, said driven member having secured thereto annular members having bearing surfaces in contact with the respective bearing surfaces of said driving member, all of said bearing surfaces being transversely curved about an axis located substantially at the center of the mass of said propeller.

11. In a propeller hub, a driving member, a driven member mounted for limited rotatory movement with relation to said driving member about the axis of the latter and for tilting movement with relation to said driving member to permit untracking without permitting pitch changes in the blades, each member having parts arranged about said axis in opposed relation to the adjacent parts of the other member, resilient means interposed between the respective opposed parts of said members to drivingly connect the same and to resist the tilting movement of said driven member, said driving member having a ball race concentric with the axis of said hub near each end of the latter, balls in said races, and said driven member having annular bearing surfaces engaging the balls in the respective races, each of said bearing surfaces being transversely curved about an axis located substantially at the center of mass of said propeller.

12. In a propeller hub, a driving member, a driven member mounted for limited rotatory movement with relation to said driving member about the axis of the latter and for tilting movement with relation to said driving member to permit untracking without permitting pitch changes in the blade, each member having parts arranged about said axis in opposed relation to the adjacent parts of the other member, resilient means interposed between the respective opposed parts of said members to drivingly connect the same and to resist the tilting movement of said driven member, said driving and driven members having near each end of said hub bearing members provided with opposed ball races, balls in said races, and means for connecting said driven member with its said bearing members for movement with relation thereto about an axis substantially coincident with the center of mass of said propeller.

13. In a propeller hub, a driving member, a driven member mounted for limited rotatory movement with relation to said driving member about the axis of the latter and for tilting movement with relation to said driving member to permit untracking without permitting pitch changes in the blades, each member having parts arranged about said axis in opposed relation to the adjacent parts of the other member, resilient means interposed between the respective opposed parts of said members to drivingly connect the same and to resist the tilting movement of said driven members, said driving and driven members having near each end of said hub bearing members provided with opposed ball races, balls in said races, said driven member and its bearing members having cooperating bearing surfaces conforming substantially to the portions of a sphere the center of which is coincident with the center of mass of said propeller, whereby said driven member may tilt with relation to its said bearing members.

14. In a propeller hub adapted for connection with a flanged driving shaft, a housing having means for securing the same to the flange of said shaft, a blade structure having a part mounted in said housing for limited rotatory movement with relation thereto about the axis of said hub and for tilting movement with relation to said housing in a plane passing through said axis, said part of said blade structure having its lateral surfaces spaced from the adjacent walls of said housing, resilient elements interposed between said lateral surfaces and said adjacent walls to drivingly connect said driving member with said blade structure and to resist the tilting movement of said blade structure, and means to positively center said blade structure against radial displacement with relation to said housing.

15. In a propeller hub adapted for connection with a flanged driving shaft, a housing having means for securing the same to the flange of said shaft, a blade structure having a part mounted in said housing for limited rotatory movement with relation thereto about the axis of said hub and for tilting movement with relation to said housing in a plane passing through said axis, said part of said blade structure having its lateral surfaces spaced from the adjacent walls of said housing, resilient elements interposed between said lateral surfaces and said adjacent walls to drivingly connect said driving member with said blade structure and to resist the tilting movement of said blade structure, and bearings interposed between said housing and said part of said blade structure to center the latter with relation to said housing and to support said blade structure for tilting movement with relation to said housing.

16. In a propeller hub adapted for connection with a flanged driving shaft, a housing having means for securing the same to the flange of said shaft, a blade structure having a part mounted in said housing for limited rotatory movement with relation thereto about the axis of said hub and for tilting movement with relation to said housing in a plane passing through said axis, said part of said blade structure having its lateral surfaces spaced from the adjacent walls of said housing, resilient elements interposed between said lateral surfaces and said adjacent walls to drivingly connect said driving member with said blade structure and to resist the tilting movement of said blade structure, said housing having near each end thereof a bearing member concentric with its axis, and said blade structure having bearing members to cooperate with the respective bearing members of said housing, at least one of said bearing members at each end of said hub conforming substantially to a portion of a sphere the center of which is coincident with the center of mass of said propeller.

17. In a propeller hub adapted for connection with a flanged driving shaft, a housing having means for securing the same to the flange of said shaft, a blade structure having a part mounted in said housing for limited rotatory movement with relation thereto about the axis of said hub and for tilting movement with relation to said housing in a plane passing through said axis, said part of said blade structure having its lateral surfaces spaced from the adjacent walls of said housing, resilient elements interposed between said lateral surfaces and said adjacent walls to drivingly connect said driving member with said blade structure and to resist the tilting movement of said blade structure, said housing having near each end thereof a ball race, balls in said races, bearing members carried by said part of said blade structure and provided with bearing surfaces to engage the balls in the respective ball races, said bearing surfaces conforming substantially to portions of a sphere the center of which is coincident with the center of mass of said propeller, and means for rigidly connecting said bearing members one to the other.

18. In a propeller hub adapted for connection with a flanged driving shaft, a housing comprising a plate having means for securing the same to the flange of said shaft, and a substantially U-shaped member rigidly secured at its open side to said plate and having its side walls substantially parallel, a blade structure having an intermediate part mounted between said side walls of said member for limited rotatory movement with relation thereto about the axis of said hub and for tilting movement with relation thereto in a plane passing through said axis, resilient elements interposed between the lateral surfaces of said part of said blade structure and the adjacent side walls to drivingly connect said driving member with said blade structure and to resist the tilting movement of the latter, and means to center said blade structure with relation to said housing and to maintain the same centered during tilting movement thereof.

19. In a propeller hub, a driving member, a driven member having an elongate opening to receive said driving member and mounted about said driving member for tilting movement with relation thereto to permit untracking without permitting pitch changes in the blades, said opening having opposed walls on each side of the axis of said driving member, said driving member having oppositely extending vanes arranged between and spaced from the respective opposed walls of said opening, and resilient elements interposed between said vanes and the respective walls of said opening to drivingly connect said driven member with said driving member and to lightly resist the untracking movement of said driven member, said driving member and said driven member having near each end of said hub cooperating bearing surfaces arranged about and concentric with the axis of said driving member to center said driven member with relation to said driving member, at least one of said bearing surfaces being transversely curved about an axis located substantially at the center of mass of the propeller to permit said driven member to tilt with relation to said driving member.

20. In a propeller hub, a driving member, a driven member having an elongate opening to receive said driving member and mounted about said driving member for tilting movement with relation thereto to permit untracking without permitting pitch changes in the blades, said opening having substantially parallel walls on each side of the axis of said driving member, said driving member having oppositely extending vanes arranged between and spaced from the respective parallel walls of said openings and decreasing in thickness toward the ends of said opening, thus providing between said vanes and the respective walls spaces which increase in depth toward the respective ends of said opening, and blocks of resilient material arranged in and filling said spaces to drivingly connect said driving member with said driven member and to yieldably resist the untracking movement of the latter, said driving member and said driven member having near each end of said hub cooperating bearing surfaces arranged about and concentric with the axis of said driving member to center said driven member with relation to said driving member, at least one of said bearing surfaces being transversely curved about an axis located substantially at the center of mass of the propeller to permit said driven member to tilt with relation to said driving member.

JEAN A. ROCHÉ.